United States Patent
Stanhope (10) Patent No.: US 10,813,272 B2
(45) Date of Patent: Oct. 27, 2020

(54) SYSTEM AND METHOD FOR DETERMINING THE POSITION OF A SENSOR MOUNTED ON AN AGRICULTURAL MACHINE BASED ON GROUND SPEED AND FIELD CHARACTERISTIC DATA

(71) Applicant: CNH Industrial America LLC, New Holland, PA (US)

(72) Inventor: Trevor Stanhope, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 108 days.

(21) Appl. No.: 16/256,044

(22) Filed: Jan. 24, 2019

(65) Prior Publication Data

US 2020/0236835 A1 Jul. 30, 2020

(51) Int. Cl.
*A01B 79/00* (2006.01)

(52) U.S. Cl.
CPC .................... *A01B 79/005* (2013.01)

(58) Field of Classification Search
CPC ................................................... A01B 79/005
See application file for complete search history.

(56) References Cited

U.S. PATENT DOCUMENTS

| | | | | |
|---|---|---|---|---|
| 6,085,135 A | * | 7/2000 | Steckel | A01B 79/005 340/988 |
| 6,336,066 B1 | * | 1/2002 | Pellenc | A01B 79/005 172/2 |
| 6,349,775 B1 | | 2/2002 | van der Lely et al. | |
| 6,553,299 B1 | | 4/2003 | Keller et al. | |
| 6,941,225 B2 | | 9/2005 | Upadhyaya et al. | |

(Continued)

FOREIGN PATENT DOCUMENTS

| | | |
|---|---|---|
| DE | 19545704 | 6/1997 |
| WO | WO 2011046461 | 4/2011 |

OTHER PUBLICATIONS

Folnovic, Tanja, Smart Sensors for Accurate Soil Measurements, Agrivi, Oct. 23, 2018 (8 pages).

(Continued)

*Primary Examiner* — Hussein Elchanti
(74) *Attorney, Agent, or Firm* — Rebecca L. Henkel; Rickard K. DeMille (57) ABSTRACT

In one aspect, a system for determining a position of a sensor mounted on an agricultural machine may include a ground speed sensor configured to capture data indicative of a ground speed of the agricultural machine. The system may also include a non-contact-based sensor configured to capture data indicative of a field characteristic of the field across which the agricultural machine is traveling. Furthermore, a controller of the system may be configured to determine a first ground speed value of the implement frame based on the data received from the ground speed sensor and a second ground speed value based on the data received from the non-contact-based sensor. Additionally, the controller may be configured to determine a position of the non-contact-based sensor relative to a field surface of the field across which the agricultural machine is traveling based on the first ground speed value and the second ground speed.

20 Claims, 5 Drawing Sheets

(56) References Cited

U.S. PATENT DOCUMENTS

| | | | | |
|---|---|---|---|---|
| 8,639,416 B2* | 1/2014 | Jones | ............ | A01B 69/007 342/357.22 |
| 8,649,930 B2* | 2/2014 | Reeve | ............ | B62D 1/28 701/24 |
| 8,897,973 B2* | 11/2014 | Hunt | ............ | G06Q 10/00 701/50 |
| 9,002,566 B2* | 4/2015 | McClure | ............ | G05D 1/0246 701/28 |
| 9,026,316 B2* | 5/2015 | Holland | ............ | A01C 21/007 701/50 |
| 9,058,560 B2* | 6/2015 | Johnson | ............ | G06N 3/02 |
| 9,113,590 B2* | 8/2015 | Johnson | ............ | A01G 22/00 |
| 9,428,885 B2 | 8/2016 | Nau | | |
| 9,510,508 B2 | 12/2016 | Jung | | |
| 9,585,307 B2 | 3/2017 | Holland | | |
| 9,743,574 B1 | 8/2017 | Maxton et al. | | |
| 9,801,329 B2 | 10/2017 | Zielke | | |
| 9,814,172 B2 | 11/2017 | Achen et al. | | |
| 9,963,836 B1 | 5/2018 | Brenner et al. | | |
| 1,000,699 A1 | 6/2018 | Chan et al. | | |
| 1,008,032 A1 | 9/2018 | Lund et al. | | |
| 10,380,811 B1* | 8/2019 | Stuart | ............ | A01C 7/00 |
| 2005/0257725 A1* | 11/2005 | Landphair | ............ | A01C 19/02 111/177 |
| 2015/0351309 A1* | 12/2015 | Gaus | ............ | A01B 76/00 172/1 |
| 2017/0112043 A1* | 4/2017 | Nair | ............ | A01B 17/002 |
| 2017/0251657 A1* | 9/2017 | Leeb | ............ | A01C 21/005 |
| 2019/0133038 A1* | 5/2019 | Arnold | ............ | A01D 34/535 |
| 2019/0322461 A1* | 10/2019 | Banthia | ............ | B60P 1/42 |
| 2019/0383650 A1* | 12/2019 | Ferrari | ............ | G01D 21/00 |
| 2020/0060071 A1* | 2/2020 | Kowalchuk | ............ | G01F 1/007 |
| 2020/0141784 A1* | 5/2020 | Lange | ............ | A01D 51/002 |

OTHER PUBLICATIONS

Hedley, Carolyn, The Development of Proximal Sensing Methods for Soil Mapping and Monitoring, and Their Application to Precision Irrigation, Massey University, 2009 (273 pages).

* cited by examiner

SYSTEM AND METHOD FOR DETERMINING THE POSITION OF A SENSOR MOUNTED ON AN AGRICULTURAL MACHINE BASED ON GROUND SPEED AND FIELD CHARACTERISTIC DATA

FIELD OF THE INVENTION

The present disclosure generally relates to agricultural machines and, more particularly, to systems and methods for determining the position of a sensor mounted on an agricultural machine based on an analysis of data indicative of the ground speed of the machine and data indicative of a characteristic of a field across which the machine is traveling.

BACKGROUND OF THE INVENTION

It is well known that, to attain the best agricultural performance from a field, a farmer must occasionally cultivate the soil, typically through a tillage operation. Modern farmers perform tillage operations by pulling a tillage implement behind an agricultural vehicle, such as a tractor. As such, tillage implements generally include a plurality of ground-engaging tools coupled to the frame that are configured to penetrate the soil to a particular depth. The ground-engaging tools may be spaced apart from each other on the frame to provide uniform tilling to the swath of the field over which the implement is towed.

When performing a tillage operation, it is desirable to create a level and uniform layer of tilled soil across the field to form a proper seedbed for subsequent planting operations. However, variations in the operating parameters of the implement and/or the soil conditions within the field may cause ground-engaging tools to penetrate the ground to varying depths and/or the implement frame to pitch and/or roll, thereby resulting in an uneven seedbed. Such poor seedbed conditions can result in a subsequent loss in the crop yield, such as due to poor germination and/or non-uniform plant stands. The positions of sensors (e.g., vision-based sensors and/or RADAR sensors) mounted on the implement relative to the ground may be indicative of variations in the penetration depths of the ground-engaging tools, frame pitch/roll, and/or other operating characteristics that create uneven seedbeds.

Accordingly, an improved system and method for determining the position of a sensor mounted on an agricultural machine would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for determining a position of a sensor mounted on an agricultural machine. The system may include a ground speed sensor configured to capture data indicative of a ground speed at which the agricultural machine is traveling across a field. The system may also include a non-contact-based sensor mounted on the agricultural machine, with the non-contact-based configured to capture data indicative of a field characteristic of the field across which the agricultural machine is traveling. Furthermore, the system may include a controller communicatively coupled to the ground speed sensor and the non-contact-based sensor. The controller may be configured to determine a first ground speed value of the implement frame based on the data received from the ground speed sensor. Moreover, the controller may be configured to determine a second ground speed value based on the data received from the non-contact-based sensor. Additionally, the controller may be configured to determine a position of the non-contact-based sensor relative to a field surface of the field across which the agricultural machine is traveling based on the first ground speed value and the second ground speed value.

In another aspect, the present subject matter is directed to an agricultural implement. The agricultural implement may include a frame and a ground speed sensor configured to capture data indicative of a ground speed at which the agricultural implement is moved across a field. The agricultural implement may also include a non-contact-based sensor mounted on the frame, with the non-contact-based sensor configured to capture data indicative of a field characteristic of the field across which the agricultural implement is being moved. Furthermore, the agricultural implement may include a controller communicatively coupled to the ground speed sensor and the non-contact-based sensor. The controller may be configured to determine a first ground speed value of the agricultural implement based on the data received from the ground speed sensor. Moreover, the controller may be configured to determine a second ground speed value of the agricultural implement based on the data received from the non-contact-based sensor. Additionally, the controller may be configured to determine a position of the frame relative to a field surface of the field based on the first ground speed value and the second ground speed value.

In a further aspect, the present subject matter is directed to a method for determining the position of a sensor mounted on an agricultural machine. The agricultural machine may include a ground speed sensor configured to capture data indicative of a ground speed at which the agricultural machine is traveling across a field. The agricultural machine may further include a non-contact-based sensor configured to capture data indicative of a field characteristic of the field across which the agricultural machine is traveling. The method may include determining, with a computing vehicle, a first ground speed value of the agricultural machine based on the data received from the ground speed sensor. Furthermore, the method may include determining, with the computing device, a second ground speed value based on data received from the non-contact-based sensor. Moreover, the method may include determining, with the computing device, a position of the non-contact-based sensor relative to a field surface of the field across which the agricultural machine is traveling based on the first ground speed value and the second ground speed value. Additionally, when the determined position of the non-contact-based sensor differs from a predetermined range of positions, the method may include initiating, with the computing device, a control action associated with adjusting an operating parameter of the agricultural machine.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining the position of a sensor mounted on an agricultural machine, such as an agricultural vehicle and/or an associated agricultural implement. Specifically, in several embodiments, a controller of the disclosed system may be configured to determine first and second ground speed values of the agricultural machine based on the data received from a ground speed sensor (e.g., a location sensor) and a non-contact-based sensor (e.g., a vision-based sensor, such as an RGB camera or thermal camera) of the machine, respectively. The determination of ground speed made based on the data captured by the ground speed sensor may be unaffected by the relative positioning of the ground speed sensor and the surface of the field across which the agricultural machine is traveling such that the first ground speed value is a "true" or actual ground speed value. Conversely, the determination of ground speed made based on the data captured by the non-contact-based sensor may vary depending on the relative positioning of the non-contact-based sensor and the field surface such that the second ground speed value is an "apparent" ground speed value. For instance, when the second ground speed value is determined based on vision data, the determined value may be greater when the vision-based sensor is closer to the field surface than when the vision-based sensor is farther away from the field surface (e.g. field characteristics may appear to travel faster or slower as a function of subject depth from the vision-based sensor from which the field characteristics are being imaged). Thereafter, the controller may be configured to compare the first and second ground speed values based on a predetermined relationship defined between "true" and "apparent" ground speeds to determine the position of the non-contact-based sensor relative to the field surface.

It should be appreciated that the position of the non-contact-based sensor may, in turn, be indicative of one or more operating parameters of the agricultural machine, such as the penetration depths of the ground-engaging tools of the machine and/or the pitch/roll of the frame of the agricultural machine. As such, when the determined position of the non-contact-based sensor differs from a predetermined range of positions, the controller may be configured to initiate one or more control actions associated with adjusting one or more operating parameters of the agricultural machine. For example, such operating parameters may include the ground speed of the machine and/or the penetration depths of the ground-engaging tools of the machine.

Figure 1:
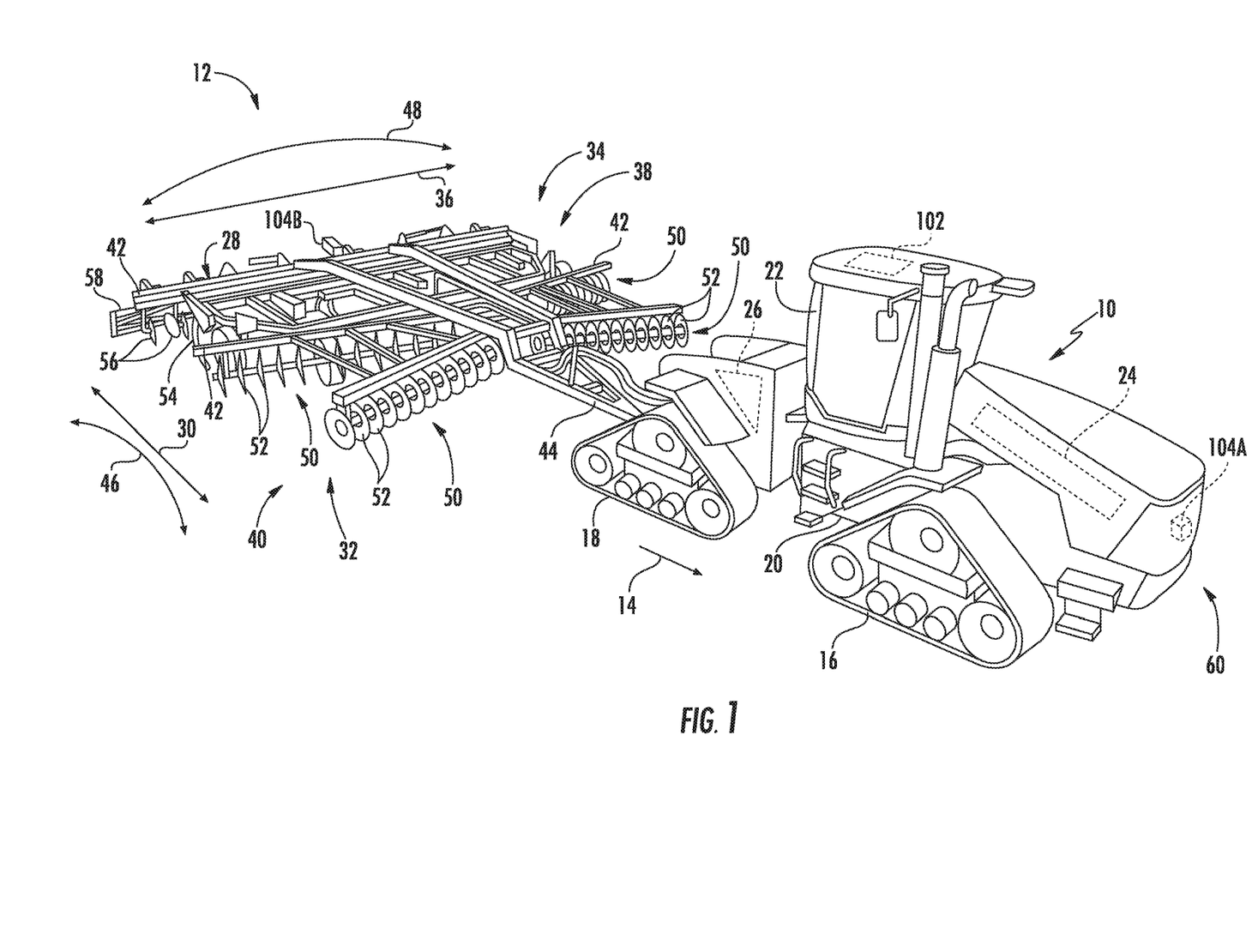
FIG. 1 illustrates a perspective view of one embodiment of an agricultural machine including an agricultural vehicle and an associated agricultural implement in accordance with aspects of the present subject matter.

Referring now to the drawings, FIG. 1 illustrates a perspective view of the agricultural machine including an agricultural vehicle 10 and an associated agricultural implement 12. In the illustrated embodiment, the agricultural machine corresponds to the combination of the agricultural vehicle 10 and the associated agricultural implement 12. As shown in FIG. 1, the vehicle 10 corresponds to an agricultural tractor configured to tow the implement 12, namely a tillage implement (e.g., a disc harrow), across a field in a direction of travel (e.g., as indicated by arrow 14 in FIG. 1). However, in other embodiments, the agricultural machine may correspond to any other suitable combination of agricultural vehicle (e.g., an agricultural harvester, a self-propelled sprayer, and/or the like) and agricultural implement (e.g., such as a planter, a seeder, a fertilizer applicator, a sprayer (a towable sprayer or a spray boom of a self-propelled sprayer), mowers, and/or the like). In addition, it should be appreciated that, as used herein, the term "agricultural machine" may refer not only to combinations of agricultural implements and vehicles, but also to individual agricultural implements and/or vehicles.

As shown in FIG. 1, the vehicle 10 may include a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the vehicle 10 and/or one or more components of the implement 12. Additionally, the vehicle 10 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

Additionally, as shown in FIG. 1, the implement 12 may include a frame 28. More specifically, the frame 28 may extend along a longitudinal direction (e.g., as indicated by arrow 30 in FIG. 1) between a forward end 32 and an aft end 34. The frame 28 may also extend along a lateral direction (e.g., as indicated by arrow 36 in FIG. 1) between a first side 38 and a second side 40. In this respect, the frame 28 generally includes a plurality of structural frame members 42, such as beams, bars, and/or the like, configured to support or couple to a plurality of components. Furthermore, a hitch assembly 44 may be connected to the frame 28 and configured to couple the implement 12 to the vehicle 10.

It may be desirable that the frame 28 remains level or substantially level relative to the ground. In general, the levelness of the frame 28 may be defined by the pitch of the frame 28 (e.g., as indicated by arrow 46 in FIG. 1) and/or the roll of the frame 28 (e.g., as indicated by arrow 48 in FIG. 1). More specifically, the pitch 46 of the frame 28 may be a differential in the heights of the forward and aft ends 32, 34 of the frame 28 in the longitudinal direction 30 of the implement 12. That is, the frame 28 may be pitched when the one of the forward or aft ends 32, 34 of the frame 28 is closer to the ground than the other of forward or aft ends 32, 34 of the frame 28. Additionally, the roll 48 of the frame 28 may be a differential in the heights of the first and second sides 38, 40 of the frame 28 in the lateral direction 36 of the implement 12. That is, the frame 28 may be rolled when the one of the first and second sides 38, 40 of the frame 28 is closer to the ground than the other of first and second sides 38, 40 of the frame 28.

In several embodiments, the frame 28 may be configured to support one or more gangs or sets 50 of disc blades 52. Each disc blade 52 may, in turn, be configured to penetrate into or otherwise engage the soil as the implement 12 is pulled through the field. In this regard, the various disc gangs 50 may be oriented at an angle relative to the direction of travel 14 to promote more effective tilling of the soil. In the embodiment shown in FIG. 1, the implement 12 includes four disc gangs 50 supported on the frame 28 adjacent to its forward end 32. However, it should be appreciated that, in alternative embodiments, the implement 12 may include any other suitable number of disc gangs 50, such as more or fewer than four disc gangs 50. Furthermore, in one embodiment, the disc gangs 50 may be mounted to the frame 28 at any other suitable location, such as adjacent to its aft end 34.

Moreover, in several embodiments, the implement frame 28 may be configured to support other ground-engaging tools. For instance, in the illustrated embodiment, the frame 28 is configured to support a plurality of shanks 54 configured to rip or otherwise till the soil as the implement 12 is towed across the field. Furthermore, in the illustrated embodiment, the frame 28 is also configured to support a plurality of leveling blades 56 and rolling (or crumbler) basket assemblies 58. However, in other embodiments, any other suitable ground-engaging tools may be coupled to and supported by the implement frame 28, such as a plurality closing discs.

Additionally, as shown in FIG. 1, a ground speed sensor 102 may be provided in operative association with the vehicle 10 and/or the implement 12. In general, the ground speed sensor 102 may be configured to capture data indicative of the "true" ground speed at which the vehicle/implement 10/12 moves across the field. As used herein, the "true" ground speed is the actual or correct ground speed at which the vehicle/implement 10/12 moves across the field. In this regard, any determination of ground speed made based on data captured by the ground speed sensor 102 may be unaffected by the relative positioning between the ground speed sensor 102 and the surface of the field across which the vehicle/implement 10/12 is traveling. As such, the ground speed sensor 102 may capture data that provides the actual or correct ground speed regardless of the how close or how far away the ground speed sensor 102 moves from the surface of the field. For example, the vehicle/implement 10/12 may encounter dry or wet soil, loose or compacted soil, bumps, divots, and/or impediments (e.g., rocks) when traversing the field that may cause the ground speed sensor 102 to move toward and away from the surface of the field. When the vehicle/implement 10/12 is traveling at a constant ground speed across the field, the data captured by the ground speed sensor 102 may provide an indication of such constant ground speed despite any movement toward and/or away from the field surface. Furthermore, in the illustrated embodiment, the ground speed sensor 102 may be mounted on and/or within the cab 22 of the vehicle 10. However, in alternative embodiments, the ground speed sensor 102 may be mounted at any other suitable location on the vehicle 10 or at any suitable location on the implement 12.

It should be appreciated that the ground speed sensor 102 may correspond to any suitable sensor or sensing device for detecting the "true" or actual ground speed of the vehicle/implement 10/12. For example, in one embodiment, the ground speed sensor 102 may correspond to a location sensor configured to detect the location of the vehicle/implement 10/12 using a satellite navigation positioning system (e.g. a GPS system, a Galileo positioning system, the Global Navigation satellite system (GLONASS), the BeiDou Satellite Navigation and Positioning system, and/or the like). In another embodiment, the ground speed sensor 102 may be configured as a Hall Effect sensor configured to detect the rotational speed of an output shaft (not shown) of the transmission 26 of the vehicle 10.

In accordance with aspects of the present subject matter, the vehicle 10 and/or the implement 10 may include one or more non-contact-based sensors coupled thereto and/or supported thereon. In general, each non-contact-based sensor may be configured to capture data from the field (e.g., of the soil and/or plants present within the field) across which the vehicle/implement 10/12 is moved. Such data may, in turn, be indicative of one or more characteristics of the field, such as the surface roughness of the field, the percent residue coverage of the field, and/or the clod sizes within the field. As such, in several embodiments, the non-contact-based sensor(s) may be provided in operative association with the vehicle 10 and/or the implement 12 such that the associated non-contact-based sensor(s) has a field of view or sensor detection range directed towards a portion(s) of the field adjacent to the vehicle 10 and/or the implement 12. For example, as shown in FIG. 1, in one embodiment, one non-contact-based sensor 104A may be provided at a forward end 60 of the vehicle 10 to capture data of a section of the field disposed in front of the vehicle 10. Similarly, as shown in FIG. 1, a second non-contact-based sensor 104B may be provided at or adjacent to the aft end 34 of the implement 12 to capture data of a section of the field disposed behind the implement 12. However, in alternative embodiments, the non-contact-based sensors 104A, 104B may be installed at any other suitable location(s) on the vehicle 10 and/or the implement 12. Additionally, in some embodiment, only one non-contact-based sensor may be mounted on either the vehicle 10 or the implement 12 or more than two non-contact-based sensors may be mounted on one or both of the vehicle 10 or the implement 12.

It should be appreciated that the data captured by the non-contact-based sensor(s) may also be indicative of the ground speed at which the vehicle/implement 10/12 moves across the field. In general, the rate at which field characteristics (e.g., bumps, depressions, residue pieces, clods, and/or the like) detected by the non-contact-based sensor(s) appear to move relative to the non-contact-based sensor(s) may provide an indication of the ground speed of the vehicle/implement 10/12. Specifically, the data captured by the non-contact-based sensor(s) may also be indicative of the "apparent" ground speed at which the vehicle/implement 10/12 moves across the field. As used herein, the "apparent" ground speed is a ground speed value that changes based on the proximity of the sensor to the objects being detected by such sensor. In this regard, any determination of ground speed made based on data captured by the non-contact-based sensor(s) may generally vary based the relative positioning between the non-contact-based sensor(s) and the surface of the field across which the vehicle/implement 10/12 is traveling. For example, the vehicle/implement 10/12 may encounter dry or wet soil, loose or compacted soil, bumps, divots, and/or impediments (e.g., rocks) when traversing the field that may cause the non-contact-based sensor(s) to move toward and/or away from the surface of the field. When the vehicle/implement 10/12 is traveling at a constant ground speed across the field, the data captured by the non-contact-based sensor(s) may provide an indication that the vehicle/implement 10/12 is moving at a greater ground speed when the non-contact-based sensor(s) is closer to the field surface than when the non-contact-based sensor(s) is farther away from the field surface.

Figure 2:
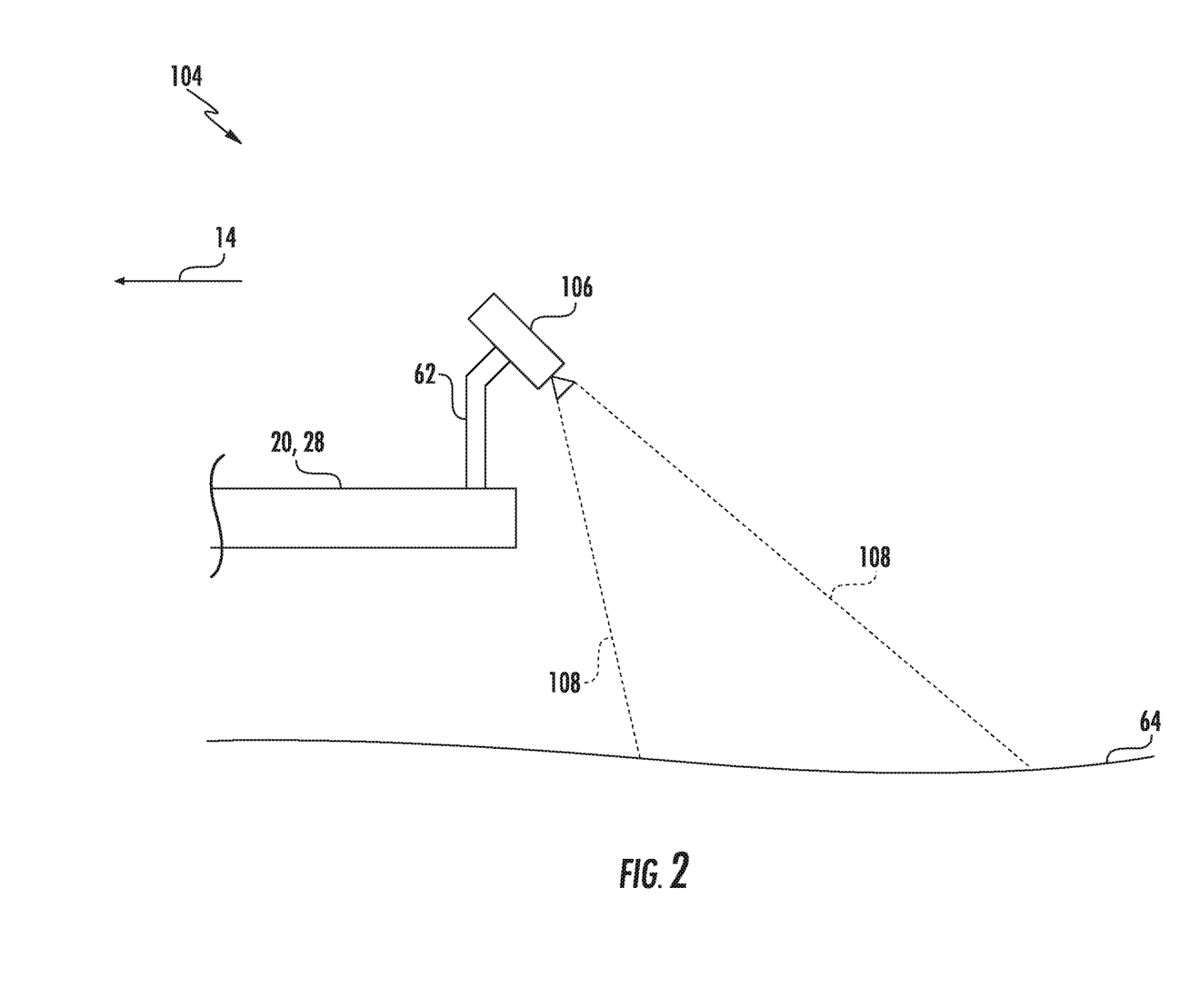
FIG. 2 illustrates a side view of one embodiment of a non-contact-based sensor mounted on an agricultural machine in accordance with aspects of the present subject matter, particularly illustrating the non-contact-based sensor corresponding to a vision-based sensor.

Referring now to FIG. 2, a side view of one embodiment of a non-contact-based sensor 104 is illustrated in accordance with aspects of the present subject matter. As shown, in several embodiments, the non-contact-based sensor 104 may be configured as a vision-based sensor 106 configured to capture image data or other vision-based data within an associated field of view (e.g., as indicated by dashed lines 108 in FIG. 2). As such, the vision-based sensor 106 may be mounted on or otherwise coupled to or mounted on the vehicle 10 or the implement 12 in any suitable manner that permits the vision-based sensor 106 to capture image data of the desired section(s) of the field across which the vehicle/implement 10/12 is traveling. For example, as shown, in one embodiment, the vision-based sensor 106 may be mounted on a support arm 62 coupled to the frame 20, 28 of the vehicle 10 or implement 12 such that the associated field of view 108 corresponds to such desired section(s) of the field. However, in alternative embodiments, the vision-based sensor 106 may be mounted on the vehicle 10 or the implement 12 at any other suitable location and/or in any other suitable manner. For example, the mounting member 62 may have any other suitable configuration. Alternatively, the vision-based sensor 106 may be mounted directly on the vehicle 10 (e.g., its frame 20) or the implement 12 (e.g., its frame 28).

It should be appreciated that the vision-based sensor 106 may correspond to any suitable sensing device(s) configured to detect or capture image data or other vision-based data (e.g., point cloud data) associated with the field present within the associated field of view. For example, in several embodiments, the vision-based sensor 106 may correspond to a suitable camera(s) configured to capture three-dimensional images of a field surface 64 of the field being traversed by the vehicle/implement 10/12 and present within the associated field of view 108. For instance, in a particular embodiment, the vision-based sensor 106 may correspond to a stereographic camera(s) having two or more lenses with a separate image sensor for each lens to allow the camera(s) to capture stereographic or three-dimensional images. Additionally, in one embodiment, the vision-based sensor 106 may correspond to an RGB camera or a thermal camera. However, in alternative embodiments, the vision-based sensor 106 may correspond to an optical sensor(s) or any other suitable vision-based sensing device(s).

Figure 3:
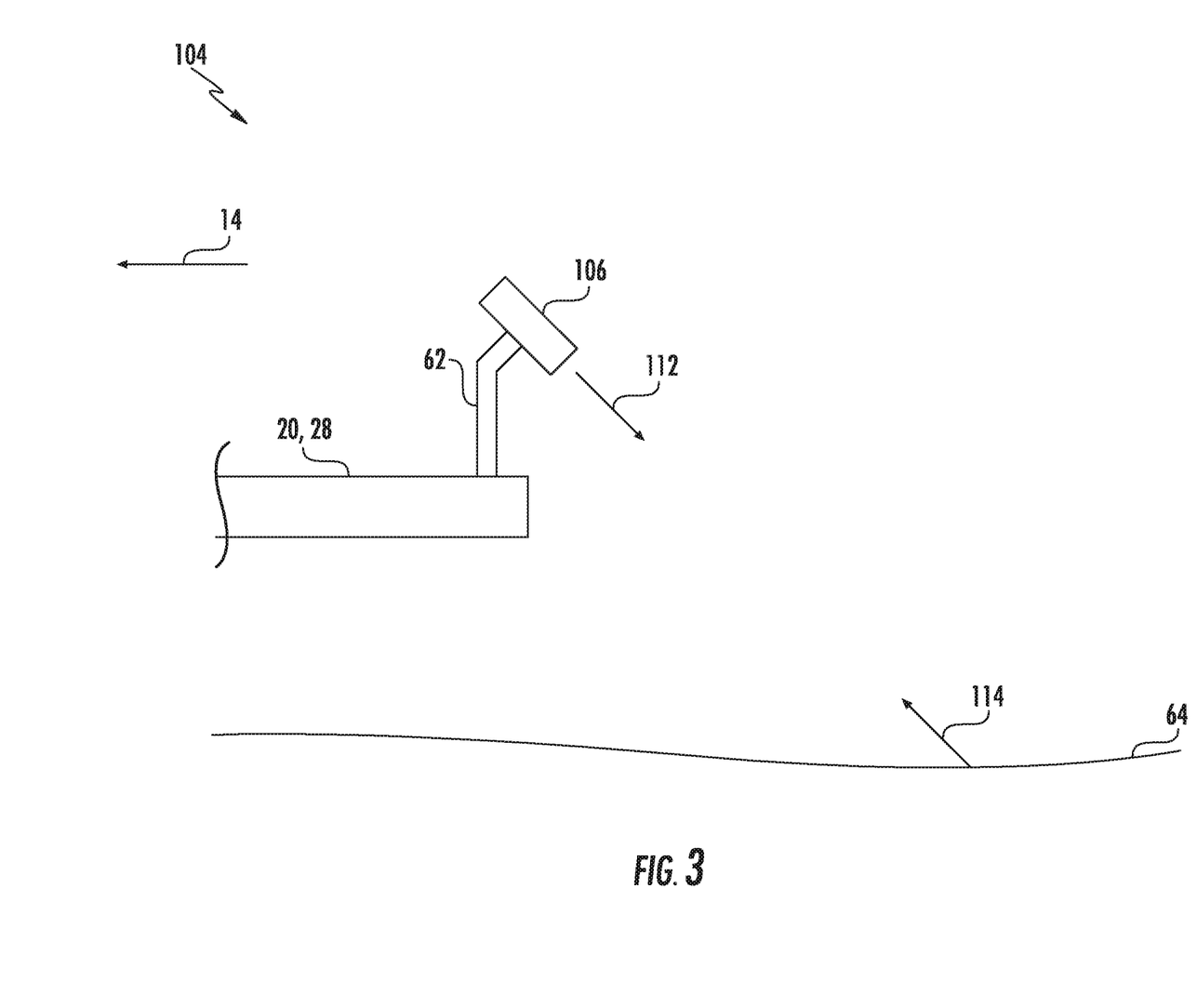
FIG. 3 illustrates a side view of another embodiment of a non-contact-based sensor mounted on an agricultural machine in accordance with aspects of the present subject matter, particularly illustrating the non-contact-based sensor corresponding to a RADAR sensor.

Referring now to FIG. 3, a side view of another embodiment of the non-contact-based sensor 104 is illustrated in accordance with aspects of the present subject matter. As shown, in several embodiments, the non-contact-based sensor 104 may be configured as a transceiver-based sensor 110 configured to emit output signals (e.g., as indicated by arrow 112 in FIG. 3) for reflection off of the surface 64 of the field across which the vehicle/implement 10/12 is traveling. The output signals 112 may, in turn, be reflected by the field surface 64 as return signals (e.g., as indicated by arrow 114 in FIG. 2). Moreover, the transceiver-based sensor 110 may be configured to receive the reflected return signals 114. As such, the transceiver-based sensor 110 may be mounted or coupled be mounted on or otherwise coupled to or mounted on the vehicle 10 or the implement 12 in any suitable manner that orients the sensor 110 such that the output signals 112 is directed at a desired section of the field surface 64. For example, as shown, in one embodiment, the transceiver-based sensor 110 may be mounted on the support arm 62 coupled to the frame 20, 28 of the vehicle 10 or implement 12 such that the output signals 112 are directed at such desired section of the field. However, in alternative embodiments, the transceiver-based sensor 110 may be mounted on the vehicle 10 or the implement 12 at any other suitable location and/or in any other suitable manner. For example, the transceiver-based sensor 110 mounted directly on the vehicle 10 (e.g., its frame 20) or the implement 12 (e.g., its frame 28).

It should be appreciated that the transceiver-based sensor 110 may generally correspond to any suitable sensing device configured to function as described herein, such as by emitting output signals for reflection off of the field surface 64 (or, alternatively, the plants growing within the field) and by receiving or sensing the return signals. For example, in one embodiment, the transceiver-based sensor 110 may correspond to a radio detection and ranging (RADAR) sensor configured to emit one or more radio signals for reflection off of the field surface 64. However, in alternative embodiments, the transceiver-based sensor 110 may correspond to a light detection and ranging (LIDAR) sensor, an ultrasonic sensor or any other suitable type of sensor.

Additionally, it should be further appreciated that the configuration of the agricultural vehicle/implement 10/12 described above and shown in FIGS. 1-3 is provided only to place the present subject matter in an exemplary field of use. Thus, it should be appreciated that the present subject matter may be readily adaptable to any manner of machine configuration.

Figure 4:
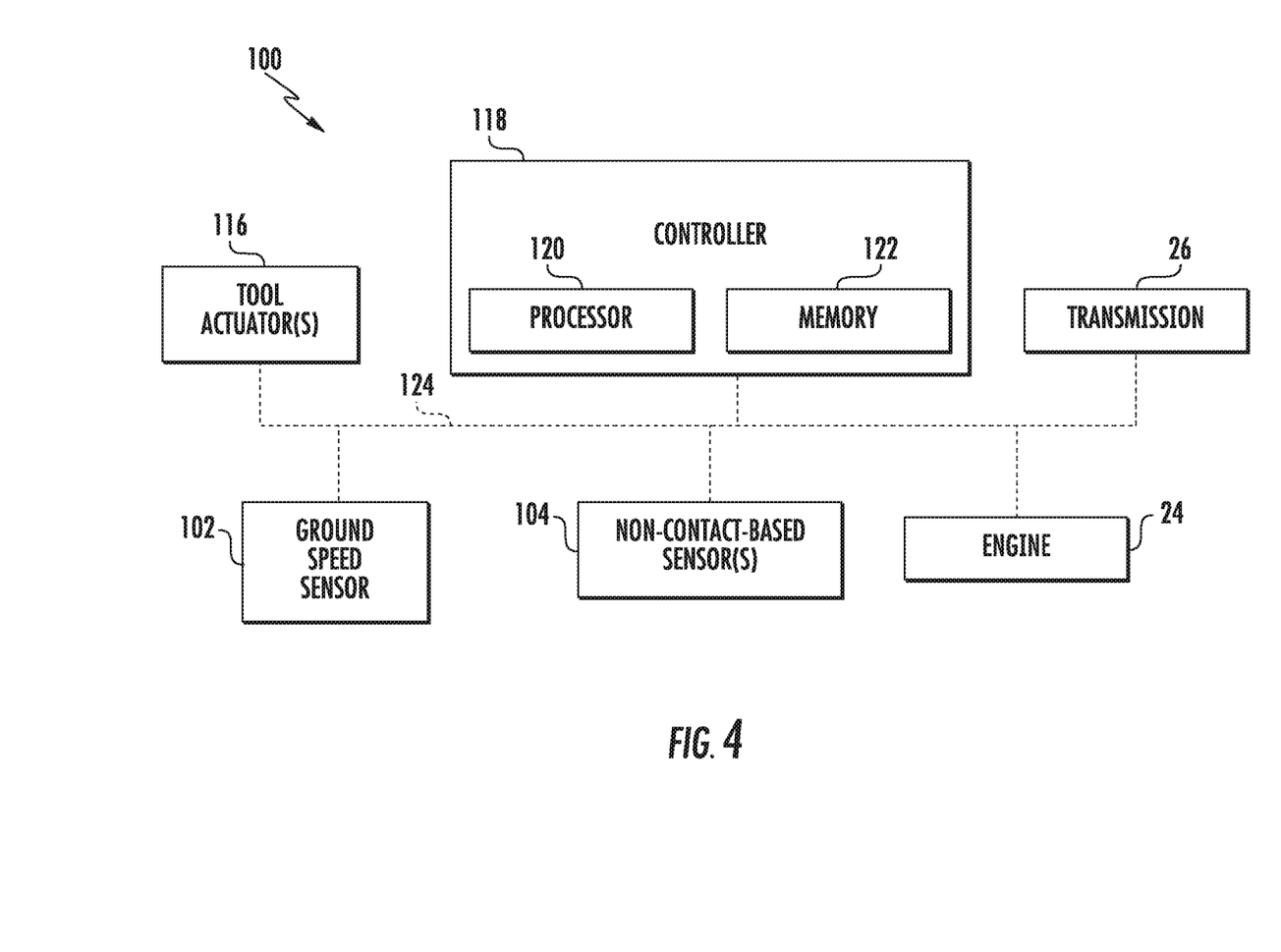
FIG. 4 illustrates a schematic view of one embodiment of a system for determining the position of a sensor mounted on an agricultural machine in accordance with aspects of the present subject matter.

Referring now to FIG. 4, a perspective view of one embodiment of a system 100 for determining the position of a sensor mounted on an agricultural machine is illustrated in accordance with aspects of the present subject matter. In general, the system 100 will be described herein with reference to the agricultural vehicle/implement 10/12 described above with reference to FIGS. 1-3. However, it should be appreciated by those of ordinary skill in the art that the disclosed system 100 may generally be utilized with agricultural machines having any other suitable machine configuration. Additionally, it should be appreciated that communicative links or electrical couplings of the system 100 shown in FIG. 4 are indicated by dashed lines.

As shown in FIG. 4, the system 100 may include one or more tool actuators 116 of the vehicle 10 and/or the implement 12. Specifically, each actuator 116 may be configured to adjust to the position or orientation of a ground-penetrating tool of implement 12, such as one of the gangs 50 of disc blades 52 and/or the shanks 54, relative to the implement frame 28. For example, in one embodiment, a first end of each actuator 116 (e.g., a rod of each actuator 116) may be coupled to the tool, while a second end of each actuator 116 (e.g., the cylinder of each actuator 116) may be coupled to the frame 28. The rod of each actuator 116 may be configured to extend and/or retract relative to the corresponding cylinder to adjust the position or orientation of the tool relative to the frame 28. In one embodiment, the actuator(s) 116 corresponds to a fluid-driven actuator(s), such as a hydraulic or pneumatic cylinder(s). However, it should be appreciated that the actuator(s) 116 may correspond to any other suitable type of actuator(s), such as an electric linear actuator(s).

In accordance with aspects of the present subject matter, the system 100 may include a controller 118 positioned on and/or within or otherwise associated with the vehicle 10 or implement 12. In general, the controller 118 may comprise any suitable processor-based device known in the art, such as a computing device or any suitable combination of computing devices. Thus, in several embodiments, the controller 118 may include one or more processor(s) 120 and associated memory device(s) 122 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 122 of the controller 118 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 122 may generally be configured to store suitable computer-readable instructions that, when implemented by the processor(s) 120, configure the controller 118 to perform various computer-implemented functions.

In addition, the controller 118 may also include various other suitable components, such as a communications circuit or module, a network interface, one or more input/output channels, a data/control bus and/or the like, to allow controller 118 to be communicatively coupled to any of the various other system components described herein (e.g., the engine 24, the transmission 26, the ground speed sensor 102, the non-contact-based sensor(s) 104, and/or the tool actuator(s) 116). For instance, as shown in FIG. 4, a communicative link or interface 124 (e.g., a data bus) may be provided between the controller 118 and the components 24, 26, 102, 104, 116 to allow the controller 118 to communicate with such components 24, 26, 102, 104, 116 via any suitable communications protocol (e.g., CANBUS).

It should be appreciated that the controller 118 may correspond to an existing controller(s) of the vehicle 10 and/or the implement 12, itself, or the controller 118 may correspond to a separate processing device. For instance, in one embodiment, the controller 118 may form all or part of a separate plug-in module that may be installed in association with the vehicle 10 and/or the implement 12 to allow for the disclosed systems to be implemented without requiring additional software to be uploaded onto existing control devices of the vehicle 10 and/or the implement 12. It should also be appreciated that the functions of the controller 118 may be performed by a single processor-based device or may be distributed across any number of processor-based devices, in which instance such devices may be considered to form part of the controller 118. For instance, the functions of the controller 118 may be distributed across multiple application-specific controllers, such as an engine controller, a transmission controller, an implement controller, and/or the like.

In several embodiments, the controller 118 may be configured to determine a first or "true" ground speed value of the vehicle/implement 10/12 based on data received from the ground speed sensor 102. As indicated above, the ground speed sensor 102 may be configured to capture data indicative of the "true" or actual ground speed of the vehicle/implement 10/12. In this regard, the controller 118 may be configured to receive data from the ground speed sensor 102 (e.g., via the communicative link 124). Thereafter, the controller 118 may be configured to analyze/process the received data to the first or "true" ground speed of the vehicle/implement 10/12. For instance, the controller 118 may include a look-up table(s), suitable mathematical formula, and/or algorithms stored within its memory 122 that correlates the received data to first or "true" ground speed of the vehicle/implement 10/12.

It should be appreciated that the first or "true" ground speed of the vehicle/implement 10/12 may not generally vary based on the position of the ground speed sensor 102 relative to the surface 64 of the field. Specifically, as indicated above, the data captured by the ground speed sensor 102 may provide the actual or correct ground speed regardless of the how close or how far away the ground speed sensor 102 moves from the field surface 64. As such, when the vehicle/implement 10/12 is traveling at a constant ground speed across the field, the determined first or "true" ground speed value may generally remain constant as the ground speed sensor 102 moves toward and away from the field surface 64, such as when the vehicle/implement 10/12 encounters bumps, divots, impediments, and/or the like.

Moreover, the controller 118 may be configured to determine a second or "apparent" ground speed value of the vehicle/implement 10/12 based on data received from the non-contact-based sensor(s) 104. As indicated above, the non-contact-based sensor(s) 104 may be configured to capture data indicative of the "apparent" ground speed of the vehicle/implement 10/12, which may generally vary based on the relative positioning between the non-contact-based sensor(s) 104 and the field surface 64. In this regard, the controller 118 may be configured to receive data from the non-contact-based sensor(s) 104 (e.g., via the communicative link 124). Thereafter, the controller 118 may be configured to analyze/process the received data to the second or "apparent" ground speed of the vehicle/implement 10/12. For instance, the controller 118 may include a look-up table(s), suitable mathematical formula, and/or algorithms stored within its memory 122 that correlates the received data to second or "apparent" ground speed of the vehicle/implement 10/12.

It should be appreciated that the second or "apparent" ground speed of the vehicle/implement 10/12 may generally vary based on the position(s) of the non-contact-based sensor(s) 104 relative to the surface 64 of the field. Specifically, as indicated above, the data captured by the non-contact-based sensor 104 may provide differing indications of ground speed depending on how close or how far away the non-contact-based sensor(s) 104 is from the field surface 64. As such, when the vehicle/implement 10/12 is traveling at a constant ground speed across the field, the determined second or "apparent" ground speed value may generally vary as the non-contact-based sensor(s) 104 moves toward and away from the field surface 64, such as when the vehicle/implement 10/12 encounters bumps, divots, impediments, and/or the like.

In several embodiments, the controller 118 may be configured to determine the second or "apparent" ground speed value based on vision data. As indicated above, in some embodiments, the non-contact-based sensor(s) 104 may correspond to a vision-based sensor(s) 106 configured to capture image data of the field surface 64. For example, in one embodiment, the controller 118 may be configured to determine the second or "apparent" ground speed value based on motion analysis (e.g., optical flow sensing or feature tracking). Specifically, in such embodiment, the controller 118 may identify field objects (e.g., bumps, ridges, depressions, rocks, field trash, residue pieces, dirt clods, and/or the like) within the captured image data. Thereafter, the controller 118 may track identified field objects within the image data to determine the rate at which such objects move across the field of view 108 of the vision-based sensor 106. The rate at which the objects move across the field of view 108 may, in turn, be indicative of the second or "apparent" ground speed value. In this regard, the controller 118 may include any suitable image processing or motion analysis algorithms stored within its memory 122 or may otherwise use any suitable image processing or motion analysis techniques to determine the second or "apparent" ground speed value based on the received image data.

In one embodiment, the controller 118 may be configured to determine the second or "apparent" ground speed value based on the output signals received from the transceiver-based sensor(s) 110. As indicated above, in some embodiments, the non-contact-based sensor(s) 104 may correspond to a transceiver-based sensor(s) 110, such as a RADAR sensor(s), configured to emit output signals 112 for reflection off of the field surface 64 and receive the return signals 114. For example, in such embodiment, the controller 118 may be configured to determine the second or "apparent" ground speed value based on the Doppler effect. Specifically, the controller 118 may monitor the wavelengths of the received return signals 114, with such wavelengths generally be indicative of the second or "apparent" ground speed. In this regard, the controller 118 may include any suitable RADAR processing or Doppler effect-based algorithms stored within its memory 122 or may otherwise use any suitable RADAR processing or Doppler effect-based techniques to determine the second or "apparent" ground speed value based on the received output signals.

In accordance with aspects of the present subject matter, the controller 118 may be configured to determine the position(s) of the non-contact-based sensor(s) 104 based on the determined first and second ground speed values. As described above, the first or "true" ground speed value may be independent of the position of the ground speed sensor 102 relative to the field surface 64. Conversely, the second or "apparent" ground speed value may vary depending on the proximity of the non-contact-based sensor(s) 104 to the field surface 64. In this regard, the difference between the first or "true" ground speed value and the second or "apparent" ground speed value may be indicative of the distance between the non-contact-based sensor(s) 104 and the field surface 64. For example, a predetermined relationship may be defined that relates the differential between the first and second ground speed values and the distance between the non-contact-based sensor(s) 104 and the field surface 64. As such, in several embodiments, the controller 118 may be configured to compare the determined first or "true" ground speed value to the determined second or "apparent" ground speed value based on the predetermined relationship to determine the distance between the non-contact-based sensor(s) 104 and the field surface 64. For instance, the controller 118 may include a look-up table(s), suitable mathematical formula, and/or algorithms stored within its memory 122 that correlates the received determine first and second ground speed values to the distance between the non-contact-based sensor(s) 104 and the field surface 64.

It should be appreciated that the determined position(s) of the non-contact-based sensor(s) 104 may be indicative of one or more operating parameters of the vehicle 10 and/or the implement 12. In general, the non-contact-based sensor(s) 104 may generally be mounted or otherwise installed on the vehicle 10 and/or the implement 12 at a fixed location thereon. In this regard, a fixed positional relationship or distance may be defined between the non-contact-based sensor(s) 104 and one or more other components of the vehicle 10 and/or the implement 12, such as the ground engaging tools (e.g., the discs 52 and/or the shanks 54). As such, in one embodiment, the controller 118 may be configured to determine the penetration depths of the ground engaging tools of the implement 12 based on the determined distance between the non-contact-based sensor 104 and the field surface 64.

Additionally, in one embodiment, the controller 118 may be configured to determine the pitch and/or roll of the implement frame 28 based on the determined position(s) of the non-contact-based sensor(s) 104. Specifically, in such an embodiment, the controller 118 may be configured to determine a two-dimensional distance between the non-contact-based sensor(s) 104 and the field surface 64 based on the first and second ground speed values. The determined two-dimensional distance may, in turn, include a vertical distance between the sensor(s) 104 and the field surface 64 and a horizontal distance (e.g., along the longitudinal direction 30 or the lateral direction 36) between the sensor(s) 104 and the field surface 64. The controller 118 may compare the determined vertical and horizontal distances to predetermined vertical and horizontal distance ranges to determine whether the frame 28 is pitched and/or rolled. For instance, when the determined vertical distance and the horizontal distance along the longitudinal direction 30 fall outside of the associated ranges, the controller 118 may determine that the frame 28 is pitched along the longitudinal direction 30. Conversely, when the determined vertical distance and the horizontal distance along the lateral direction 36 fall outside of the associated ranges, the controller 118 may determine that the frame 28 is rolled along the lateral direction 36. In an alternative embodiment, the pitch and/or roll of the implement frame 28 may be determined with a single non-contact-based 2D vision-based sensor by detecting the two or more "apparent" ground-speed values of two or more field characteristics within the associated field of view. For instance, when a vision-based sensor rigidly mounted to the frame 28 is rolled along the lateral direction 36, field characteristics that are nearer to the axis of roll would appear to be travelling faster than those characteristics that are farther from the axis of roll (e.g., the characteristics that are now further in distance from the vision-based sensor 106). Therefore, when field characteristics appear to move faster in one region of the field of view than another region, the controller 108 may interpret such differential to mean that the vision-based sensor 106 is not orthogonally aligned with the field surface. In this regard, the controller 106 may compare the two or more "apparent" ground speed values to the "true" first ground speed value to calculate the degree of pitch and/or roll being experienced by the frame 28.

It should be appreciated that the controller 118 may be configured to determine any other suitable parameter of the vehicle 10 and/or the implement 12 based on the determined position(s) of the non-contact-based sensor(s) 104. For example, in one embodiment, the controller 118 may be configured to determine the orientation of the frame 20 of the vehicle 10 relative to the field surface 64 based on the determined distance between the non-contact-based sensor(s) 104 and the field surface 64. Additionally, in another embodiment, the controller 118 may be configured to determine whether vehicle 10 is bouncing based on the determined distance between the non-contact-based sensor(s) 104 and the field surface 64.

Furthermore, the controller 118 may be configured to initiate one or more control actions when it is determined that the determined position(s) of the non-contact-based sensor(s) 104 differs from a predetermined range(s) of positions. In general, when the determined position(s) of the non-contact-based sensor(s) 104 differs from the predetermined range(s) of positions, one or more operating parameters of the vehicle 10 and/or the implement 12 may fall outside of associated predetermined range(s) for such parameters. As such, the control action(s) may be associated with adjusting one or more operating parameters of the vehicle 10 and/or the implement 12. For example, as indicated above, in one embodiment, the determined position(s) of the non-contact-based sensor(s) 104 may be indicative of the pitch/roll of the implement frame 28. In such embodiment, when the determined position(s) of the non-contact-based sensor(s) 104 differs from the predetermined range of positions, the frame 28 may be pitched and/or rolled such that the frame 28 is out-of-level. In such instances, the controller 118 may be configured to initiate any suitable control action(s) associated with leveling the frame 28. In another embodiment, as indicated above, the determined position(s) of the non-contact-based sensor(s) 104 may be indicative of the penetration depths of the ground engaging tools of the implement 12. In such embodiment, when the determined position(s) of the non-contact-based sensor(s) 104 differs from the predetermined range of positions, the penetration depths of the ground engaging tools may be too deep or too shallow. In such instances, the controller 118 may be configured to initiate any suitable control action(s) associated with adjusting the penetration depths of the ground engaging tools.

In one embodiment, the controller 118 may be configured to automatically adjust the ground speed at which the vehicle/implement 10/12 is being moved across the field when it is determined that the position(s) of the non-contact-based sensor(s) 104 falls outside of the predetermined range of positions. Specifically, the controller 118 may be configured to transmit instructions to the engine 24 and/or the transmission 26 of the vehicle 12 (e.g., via the communicative link 124) instructing the engine 24 and/or the transmission 26 to adjust their operation. For example, the controller 118 may instruct the engine 24 to vary its power output and/or the transmission 26 to upshift or downshift to increase or decrease the ground speed of the vehicle/implement 10/12 in a manner that adjusts the position(s) of the non-contact-based sensor(s) 104. However, it should be appreciated that, in alternative embodiments, the controller 118 may be configured to transmit instructions to any other suitable components (e.g., braking actuators) of the vehicle 10 and/or the implement 12 such that the ground speed of the vehicle/implement 10/12 is adjusted.

Moreover, in another embodiment, the controller 118 may be configured to initiate adjustment of the penetration depth(s) of and/or down pressure being applied to the ground-engaging tools (e.g., the disc blades 52 and/or the shanks 54) of the implement 12. For example, the controller 118 may be configured transmit instructions to the tool actuator(s) 116 (e.g., via the communicative link 124 instructing the actuator(s) 116 to adjust the penetration depth(s) of and/or pressures being applied to the associated tool(s). However, it should be appreciated that, the controller 118 may be configured to initiate adjustments of any other suitable operating parameters of the vehicle 10 and/or the implement 12 when the determined position(s) of the non-contact-based sensor(s) 104 differs from the predetermined range of sensor positions.

Figure 5:
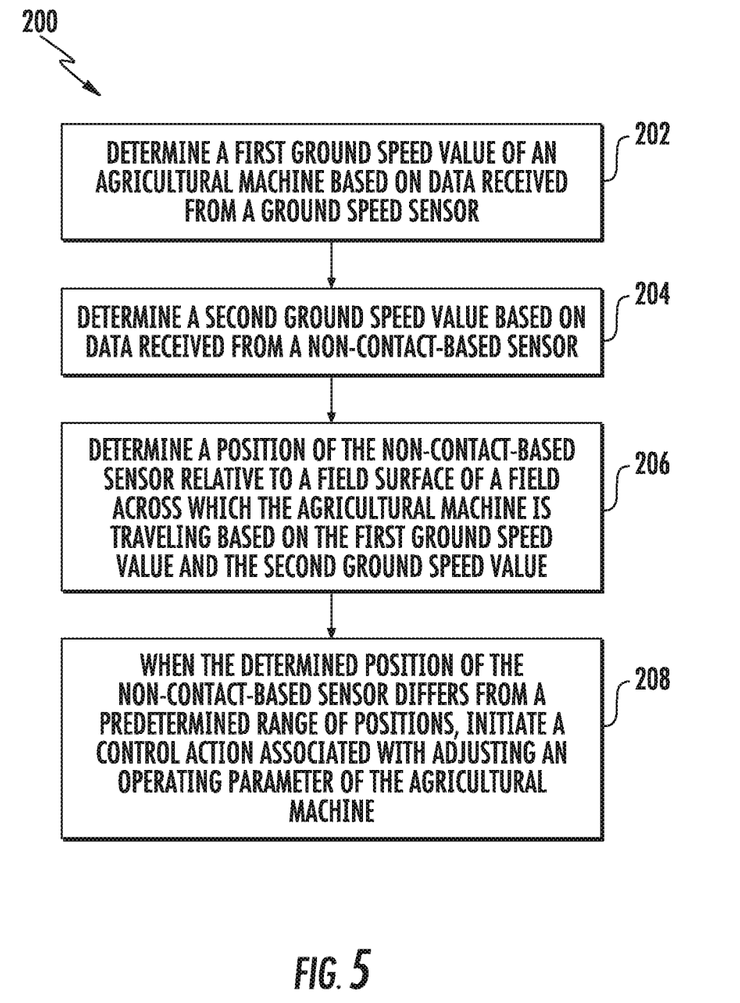
FIG. 5 illustrates a flow diagram of one embodiment of a method for determining the position of a sensor mounted on an agricultural machine in accordance with aspects of the present subject matter.

Referring now to FIG. 5, a flow diagram of one embodiment of a method 200 for determining a position of a sensor mounted on an agricultural machine is illustrated in accordance with aspects of the present subject matter. In general, the method 200 will be described herein with reference to the agricultural vehicle/implement 10/12 and the system 100 described above with reference to FIGS. 1-4. However, it should be appreciated by those of ordinary skill in the art that the disclosed method 200 may generally be implemented with any agricultural machine having any suitable machine configuration and/or any system having any suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (202), the method 200 may include determining, with a computing vehicle, a first ground speed value of an agricultural machine based on data received from a ground speed sensor. For instance, as described above, the controller 118 may be configured to determine a first ground speed value of a vehicle 10 and/or an implement 12 based on data received from a ground speed sensor 102.

Additionally, at (204), the method 200 may include determining, with the computing device, a second ground speed value based on data received from the non-contact-based sensor. For instance, as described above, the controller 118 may be configured to determine a second ground speed value of the vehicle 10 and/or the implement 12 based on data received from a non-contact-based sensor 104, such as a vision-based sensor 106 and/or a transceiver-based sensor 110.

Moreover, as shown in FIG. 5, at (206), the method 200 may include determining, with the computing device, a position of the non-contact-based sensor relative to a field surface of a field across which the agricultural machine is traveling based on the first ground speed value and the second ground speed value. For instance, as described above, the controller 118 may be configured to compare the determined first and second ground speed values to determine the position of the non-contact-based sensor 104 relative to the surface 64 of the field across which the vehicle/implement 10/12 is traveling.

Furthermore, at (208), when the determined position of the non-contact-based sensor differs from a predetermined range of positions, the method 200 may include, initiating, with the computing device, a control action associated with adjusting an operating parameter of the agricultural machine. For instance, as described above, when it is determined that the position of the non-contact-based sensor 104 differs from a predetermined range of positions, the controller 118 may be configured to initiate one or more control actions associated with adjusting one or more operating parameters of the vehicle 10 and/or the implement 12. Such operating parameter(s) may include the ground speed of the vehicle/implement 10/12 and/or the penetration depths of one or more ground-engaging tools (e.g., the gangs 50 of discs 52) mounted on the implement 12.

It is to be understood that the steps of the method 200 are performed by the controller 118 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 118 described herein, such as the method 200, is implemented in software code or instructions which are tangibly stored on a tangible computer readable medium. The controller 118 loads the software code or instructions via a direct interface with the computer readable medium or via a wired and/or wireless network. Upon loading and executing such software code or instructions by the controller 118, the controller 118 may perform any of the functionality of the controller 118 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for determining a position of a sensor mounted on an agricultural machine, the system comprising:
a ground speed sensor configured to capture data indicative of a ground speed at which the agricultural machine is traveling across a field;
a non-contact-based sensor mounted on the agricultural machine, the non-contact-based sensor configured to capture data indicative of a field characteristic of the field across which the agricultural machine is traveling;
a controller communicatively coupled to the ground speed sensor and the non-contact-based sensor, the controller configured to:
determine a first ground speed value of the agricultural machine based on the data received from the ground speed sensor;
determine a second ground speed value of the agricultural machine based on the data received from the non-contact-based sensor; and
determine a position of the non-contact-based sensor relative to a field surface of the field across which the agricultural machine is traveling based on the first ground speed value and the second ground speed value.

2. The system of claim 1, wherein the controller is further configured to compare the first ground speed value and the second ground speed value to determine the position of the non-contact-based sensor.

3. The system of claim 2, wherein the controller is further configured to compare the first ground speed value and the second ground speed value based on a predetermined relationship between true speed and apparent speed.

4. The system of claim 1, wherein the non-contact-based sensor corresponds to a vision-based sensor, the controller further configured to determine the second ground speed value based on motion analysis.

5. The system of claim 1, wherein the vision-based sensor comprises an RGB camera or a thermal camera.

6. The system of claim 1, wherein the non-contact-based sensor corresponds to a RADAR sensor, the controller further configured to the second ground speed value based on the doppler Effect.

7. The system of claim 1, wherein the field characteristic comprises at least one of a surface finish of the field, a percent residue coverage of the field, or a clod size of the field.

8. The system of claim 1, wherein the ground speed sensor comprises a location sensor.

9. The system of claim 1, wherein the controller is further configured to initiate a control action when the determined position of the non-contact-based sensor differs from a predetermined range of positions.

10. The system of claim 9, wherein the control action comprises adjusting an operating parameter of the agricultural machine.

11. The system of claim 10, wherein the controller is further configured to determine at least one of a pitch or a roll of the agricultural machine based on the data received from the non-contact-based sensor.

12. An agricultural implement, comprising:
a frame;
a ground speed sensor configured to capture data indicative of a ground speed at which the agricultural implement is moved across a field;
a non-contact-based sensor mounted on the frame, the non-contact-based sensor configured to capture data indicative of a field characteristic of the field across which the agricultural implement is being moved;
a controller communicatively coupled to the ground speed sensor and the non-contact-based sensor, the controller configured to:
determine a first ground speed value of the agricultural implement based on the data received from the ground speed sensor;
determine a second ground speed value of the agricultural implement based on the data received from the non-contact-based sensor; and
determine a position of the frame relative to a field surface of the field based on the first ground speed value and the second ground speed value.

13. The agricultural implement of claim 10, wherein the controller is further configured to determine at least one of a pitch of the frame or a roll of the frame based on the determined position of the frame.

14. The agricultural implement of claim 12, wherein the controller is further configured to compare the first ground speed value and the second ground speed value to determine the position of the non-contact-based sensor.

15. The agricultural implement of claim 14, wherein the controller is further configured to compare the first ground speed value and the second ground speed value based on a predetermined relationship between true speed and apparent speed.

16. A method for determining the position of a sensor mounted on an agricultural machine, the agricultural machine including a ground speed sensor configured to capture data indicative of a ground speed at which the agricultural machine is traveling across a field, the agricultural machine further including a non-contact-based sensor configured to capture data indicative of a field characteristic of the field across which the agricultural machine is traveling, the method comprising:

determining, with a computing vehicle, a first ground speed value of the agricultural machine based on data received from the ground speed sensor;

determining, with the computing device, a second ground speed value of the agricultural machine based on data received from the non-contact-based sensor; and determining, with the computing device, a position of the non-contact-based sensor relative to a field surface of the field across which the agricultural machine is traveling based on the first ground speed value and the second ground speed value; and when the determined position of the non-contact-based sensor differs from a predetermined range of positions, initiating, with the computing device, a control action associated with adjusting an operating parameter of the agricultural machine.

17. The method of claim 16, further comprising:
comparing, with the computing device, the first ground speed value and the second ground speed value to determine the position of the non-contact-based sensor.

18. The method of claim 17, further comprising:
comparing, with the computing device, the first ground speed value and the second ground speed value based on a predetermined relationship between true speed and apparent speed.

19. The method of claim 16, wherein the non-contact-based sensor corresponds to a vision-based sensor, the method further comprising:
determining, with the computing device, the second ground speed value based on motion analysis.

20. The method of claim 16, further comprising:
determining, with the computing device, at least one of a pitch or a roll of the agricultural machine based on the data received from the non-contact-based sensor.

* * * * *